C. H. BIERBAUM.
TROLLEY.
APPLICATION FILED MAY 13, 1907.
988,754.
Patented Apr. 4, 1911.
2 SHEETS—SHEET 1.
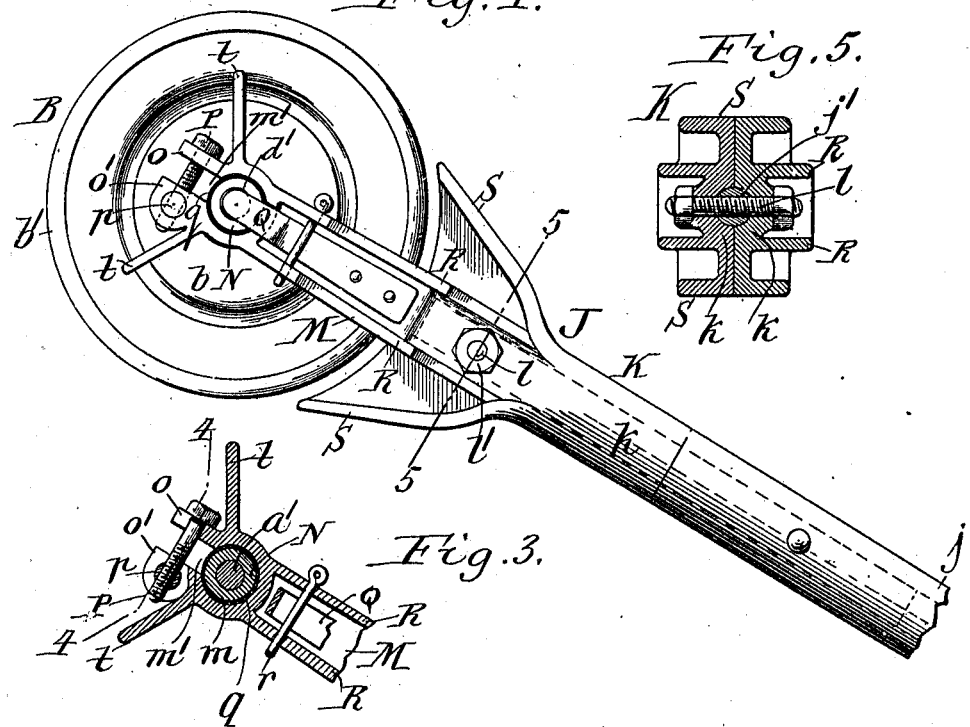
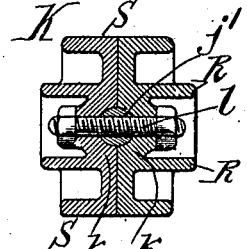
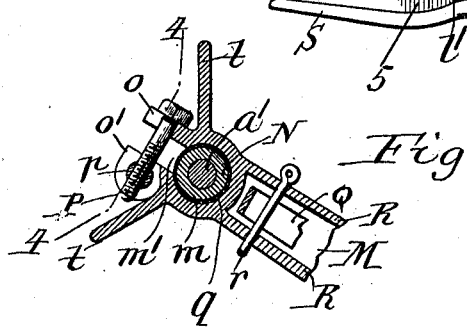
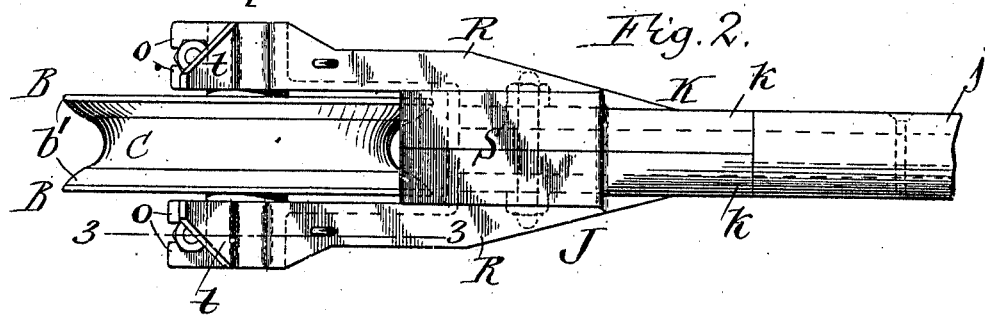
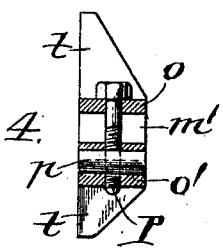
Witnesses:
Richard Sommer.
Gustav W. Hora.
Inventor
C. H. Bierbaum
by Geyer & Popp
Attorneys.

C. H. BIERBAUM.
TROLLEY.
APPLICATION FILED MAY 13, 1907.
988,754.
Patented Apr. 4, 1911.
2 SHEETS—SHEET 2.
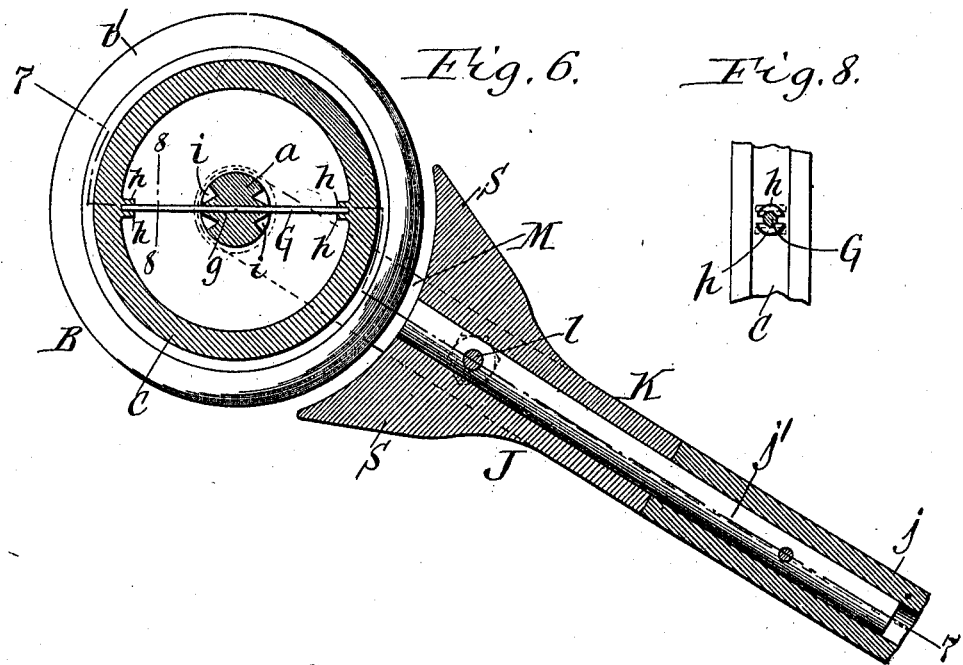
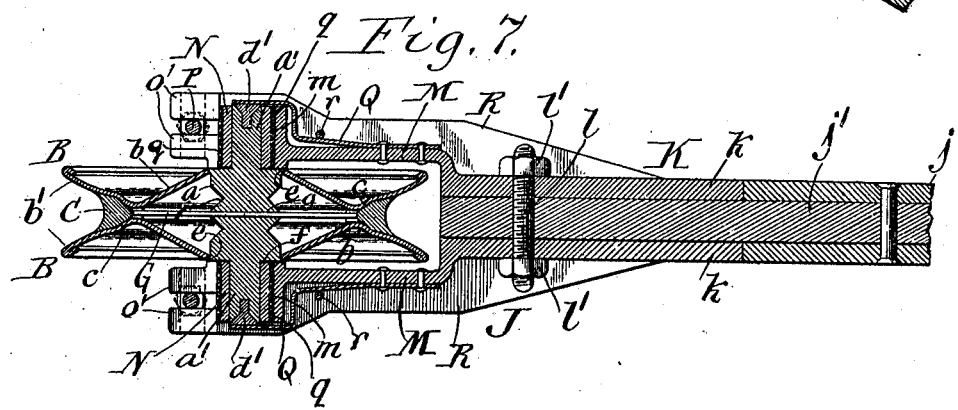
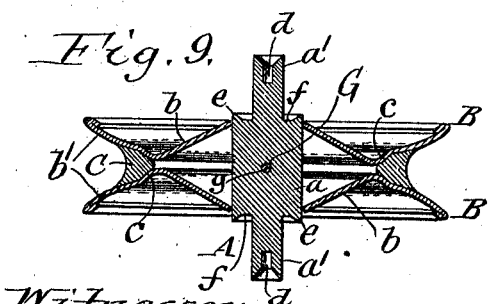
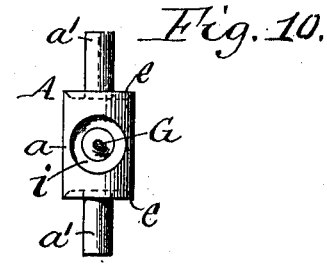

UNITED STATES PATENT OFFICE.

CHRISTOPHER H. BIERBAUM, OF BUFFALO, NEW YORK.

TROLLEY.

988,754. Specification of Letters Patent. Patented Apr. 4, 1911.

Application filed May 13, 1907. Serial No. 373,233.

*To all whom it may concern:*

Be it known that I, CHRISTOPHER H. BIERBAUM, a citizen of the United States, residing at Buffalo, in the county of Erie and State of New York, have invented a new and useful Improvement in Trolleys, of which the following is a specification.

This invention relates to a trolley wheel and harp and has the object to so construct these parts as to secure the maximum strength and wearing capacity, better conductivity for the electric current and greater facility for applying the wheel to or removing the same from the harp when necessary.

In the accompanying drawings consisting of 2 sheets: Figure 1 is a side elevation of my improved trolley wheel and harp. Fig. 2 is a top plan view thereof. Fig. 3 is a fragmentary vertical longitudinal section in line 3—3, Fig. 2. Fig. 4 is a cross section in line 4—4, Fig. 3. Fig. 5 is a cross section in line 5—5, Fig. 1. Fig. 6 is a vertical longitudinal section taken centrally through the trolley wheel and harp. Fig. 7 is a horizontal longitudinal section in line 7—7, Fig. 6. Fig. 8 is a fragmentary cross section in line 8—8, Fig. 6. Fig. 9 is a cross section of the wheel detached from the harp, the section being taken at right angles to Fig. 6. Fig. 10 is a detached plan view of the hub of the wheel.

Similar letters of reference indicate corresponding parts throughout the several views.

In its general organization the trolley wheel comprises a hub A, a pair of disks, B, B mounted on the hub and a bearing or tread ring C arranged between the disks.

The hub is constructed from a single piece of metal preferably of iron or steel, so as to form a central enlarged cylindrical body $a$ and reduced cylindrical trunnions $a^1$, $a^1$ at opposite ends of the body. In the outer end of each trunnion a countersunk recess or opening $d$ is formed which receives a contact piece consisting of a headed copper rivet $d^1$ of corresponding form, the function of which will be described later.

Each of the disks is provided with a central opening which receives the body of the hub. The central parts or webs $b$ of these disks are dished or bulged outwardly and bear with the bore of their openings against the periphery of the hub body at opposite ends thereof. The outer parts or flanges $b^1$ of the disks diverge forming annular seats or shoulders $c$ between them against which the bore of the bearing ring rests. The disks are held on the hub and against opposite sides of the bearing ring by means of annular flanges $e$ arranged on the marginal portion of the hub at opposite ends thereof and bearing against the outer side of the disks, at the inner edges thereof, as shown in Fig. 7. The stock or material forming these flanges is formed originally on the ends of the hub body so that they project therefrom in the direction of its axis and are flush with the periphery of the body as shown in Fig. 9, thereby permitting the disks to be slid over these flanges onto the hub and into engagement with the bearing ring. After the parts have been thus assembled, the flanges $e$ are upset or turned outwardly against the outer side of the disks at the inner edge thereof, as shown in Fig. 7, by spinning, swaging or otherwise displacing the metal of the flanges for this purpose. By this means the hub, disks and bearing ring are firmly secured together without the use of screws, rivets, screw joints or the like which are liable to become loose, wear rapidly and shorten the life of the wheel accordingly. The flanges $e$ on the hub are turned outwardly against the disk to such an extent as to leave practically square shoulders $f$ at opposite ends of the hub body as shown in Fig. 7.

In practice the hub and bearing are preferably cast or drop forged of steel or iron and the disks stamped out of sheet steel or other metal but these parts may be otherwise constructed if desired.

In order to produce a good electric connection between the bearing ring and the hub the following means are provided: G represents a transmitting wire which is connected with the hub and at one or both of its ends with the bearing ring. As shown in Figs. 6 and 7, this wire is arranged diametrically relatively to the wheel and passes with its central part through a diametrical opening $g$ in the central part of the hub body while each of its ends is arranged between a pair of lips or lugs $h$ on the inner side or bore of the bearing ring. The transmitting wire is soldered in the opening of the hub and to permit of performing this operation readily and reliably the hub is provided on its periphery around each end of the opening $g$ with an annular groove $i$ the inner side of which terminates next to the adjacent outer end of the opening $g$. By this means only a thin wall or edge of metal is left around the wire G at opposite ends of the opening which permits this metal to be readily heated by a soldering iron or otherwise when said wire is to be soldered to the hub. The ends of the wire are secured to the bearing ring by pressing each pair of the lugs $h$ against opposite sides of the adjacent end of the wire, as shown in Figs. 6 and 8, and also soldering the lugs and wire together. By this means a perfect electric contact or connection is produced between the bearing ring and hub which conducts the current with the least amount of resistance and without relying on the disks to carry any part of the current.

In assembling the wheel the hub and bearing ring are first connected by the transmitting wire and then the disks are secured to the bearing ring and hub in the manner described.

The harp J whereby the trolley wheel is supported on the trolley pole $j$ is preferably constructed as follows: K represents the socket of the harp which receives the reduced stem $j^1$ at the upper end of the pole and which may be constructed in one piece but which for convenience of manufacture is preferably divided into two sections $k$, $k$ which are secured to opposite sides of the pole. The preferred means for thus connecting the socket sections and the trolley pole consists of a transverse rod or bolt $l$ passing through coinciding openings in the socket section and pole stem, and screw nuts $l^1$ applied to opposite ends of the bolt and bearing against the outer sides of the socket sections, as shown in Figs. 5 and 7. Projecting forwardly from the socket sections, respectively and arranged on opposite sides of the trolley wheel are the two horns or arms M forming the fork of the harp. Each of these arms is provided at its front end with a transverse cylindrical bearing socket $m$ which is open at its inner and outer ends and also provided with a longitudinal slit $m^1$ on its front side. Within each bearing socket is arranged a cylindrical bearing bushing N which bears at its inner end against the adjacent shoulder $f$ of the wheel hub and in which is journaled one of the trunnions or ends of the wheel hub or axle. The width of the slits $m^1$ of the sockets $m$ is equal to the diameter of the trunnions. By this means the trolley wheel may be removed from the harp by first withdrawing the bushings axially outward from the trunnions and sockets and then the trunnions may be passed forwardly through the slits $m^1$ of the sockets. These parts are assembled reversely of the order just described. In order to hold the bushings securely in their sockets each of the latter has the parts on opposite sides of its slit connected by a clamping device which preferably consists of bifurcated lugs $o$, $o^1$ projecting laterally from each of said bearing sockets above and below its slit, a cylindrical rotatable rod or screw nut $p$ journaled at opposite ends in correspondingly shaped openings formed in the members of the lower bifurcated lug, and a clamping bolt P arranged between the members of both bifurcated lugs and engaging its lower threaded end with the rotatable screw nut while the head at its upper end bears against the upper bifurcated lug. Upon tightening the clamping screws the bearing sockets are contracted causing the bushings to be gripped or clamped in the same. Upon loosening the clamping bolts the bearing sockets are permitted to relax their grip on the bushings enabling the latter to be removed axially from the bearing sockets and trunnions. Upon swinging the clamping bolts out of engagement from the upper lugs of the bearing sockets the trunnions of the wheel may be moved forwardly through the slits of said sockets. By this means the wheel or the bushings may be readily and conveniently renewed or repaired when necessary.

In trolley wheels as heretofore constructed the wheel usually turned on a transverse pin or axle secured to the harp which pin or axle was of comparatively large diameter. In the present construction the trunnions which are fixed on the wheel and turn in bearings on the harp are of smaller diameter but together the same furnish a larger bearing surface than that between the former wheel and axle, thereby rendering the same more durable.

Lengthwise on the outer side of each harp arm is arranged a spring brush Q of leaf form which is secured at its rear end to the respective arm while its front end bears against the copper rivet or contact piece at the outer end of the corresponding trunnion, thereby forming a good electrical connection between the wheel hub and harp. In order to confine the path of the electric current to said brushes the bushings are insulated from the harp arms by interposing a sheet of rice paper $q$ or other insulating material between each bushing and its sockets. By engaging the brushes with the outer ends of the wheel hub in the manner described the friction between the movable and stationary parts is reduced to a minimum being at the center of rotation while at the same time a good frictional contact is produced for reliably carrying the current from the wheel to the harp. Each of the contact brushes is preferably bent into substantially Z form to permit the same to follow the contour of the adjacent part of the harp, the front part of the brush bearing against the end of a trunnion being arranged outermost, the rear part secured to the harp arm being innermost and parallel with the front part and the intermediate part being at right angles to the front and rear parts and arranged along the rear side of the adjacent bearing socket. The brushes are sufficiently elastic to permit the same to be deflected for clearing the path of the bushings upon inserting the same into the bearing sockets or removing the same therefrom. In order however to cause the brushes to bear firmly against the ends of the trunnions and guard against the possibility of the brushes being deflected unduly and set, each of these brushes is held in its operative position by a transverse removable retaining pin $r$ bearing with its central part against the outer side of the rear part of the respective brush. These pins pass at opposite ends through openings formed in ribs or flanges R which are arranged lengthwise on the horizontally opposite sides of the adjacent part of the harp, as shown in Figs. 1, 3 and 7. The flanges preferably extend along the pole socket, arms, and bearing sockets of the harp and are higher than the adjacent parts on the outer side of the harp so as to protect the same from injury. The several ribs together are constructed to form a substantially forwardly enlarging wedge whereby the same are prevented from becoming caught on the cross wires which support the trolley wire or other obstruction.

On its vertically opposite sides the front part of the harp is provided with inclined guards S which diverge or lead at an angle from the pole socket toward the periphery of the wheel and serve to guide the wheel past any obstruction which it may encounter, thereby preventing the wheel from striking such an obstruction squarely and causing injury. By providing such guards on the top and bottom of the harp the wheel will be protected upon using the trolley wheel with either side of the harp facing upwardly.

To facilitate engagement of the trolley wheel with the trolley wire and prevent the same from striking abrupt shoulders on the harp the latter is provided on opposite sides of the wheel with guide lugs $t$ which are arranged on the harp arms and extend radially from the bearing sockets toward the periphery of the wheel and have their outer edges inclined, as shown in Figs. 1, 2, 3 and 4.

I claim as my invention:

1. A trolley wheel comprising a hub, a bearing ring, two disks arranged on said hub and engaging with opposite sides of the ring, and displaced portions on the hub engaging with said disks for holding the same in place, said hub being provided at opposite ends with journals which are formed integrally therewith, substantially as set forth.

2. A trolley wheel comprising a hub, a bearing ring, two disks arranged on said hub and engaging with opposite sides of the ring, and outwardly turned annular flanges formed on said hub and engaging with the outer sides of said disks, said hub being provided at opposite ends with journals which are formed integrally therewith, substantially as set forth.

3. A trolley wheel comprising a hub provided at opposite ends with integral journals, a one-piece bearing ring separate from said hub, two disks arranged on said hub and engaging with opposite sides of the ring, and a transmitting wire connecting said ring with the hub, independently of the other mechanical connections between the ring and hub, substantially as set forth.

4. A trolley wheel comprising a hub, a bearing ring, two disks arranged on said hub and engaging with opposite sides of the ring, and a diametrical transmitting wire independent of the other mechanical connections between the ring and hub, connected centrally with said hub and connected at opposite ends with said ring.

5. A trolley wheel comprising a hub, a bearing ring, two disks arranged on said hub and engaging with opposite sides of the ring, a transmitting wire independent of the other mechanical connections between the ring and hub, connected with said hub, and a lug on the inner side of said ring to which said wire is secured, substantially as set forth.

6. A trolley wheel comprising a hub, a bearing ring, two disks arranged on said hub and engaging with opposite sides of the ring, a transmitting wire independent of other mechanical connections between the ring and hub, connected with said hub, and a pair of lugs arranged on the inner side of said ring and adapted to receive the end of said wire between them, substantially as set forth.

7. A trolley wheel comprising a hub, a bearing ring, two disks arranged on said hub and engaging with opposite sides of the ring, a transmitting wire independent of other mechanical connections between the ring and hub, connected with said hub, and a pair of lugs which are arranged on said ring and between which the end of said wire is adapted to be pressed and soldered, substantially as set forth.

8. A trolley wheel comprising a hub having an opening and a recess adjacent to the opening, a bearing ring, disks arranged on said hub and engaging opposite sides of said ring, and a transmitting wire independent of other mechanical connections between the ring and hub connected with said ring and secured in the opening of the hub by soldering, substantially as set forth.

9. A trolley wheel comprising a hub having an opening through the same, a bearing ring, two disks arranged on said hub and engaging opposite sides of the ring, and a transmitting wire independent of other mechanical connections between the ring and hub, extending through said opening and secured at opposite ends to said ring, substantially as set forth.

10. A trolley wheel comprising a hub having an opening through the same and a recess or groove around said opening so as to leave a thin wall between said opening and groove, a bearing ring, two disks arranged on said hub and engaging opposite sides of the ring, and a transmitting wire independent of other mechanical connections between the ring and hub, soldered with its central part in said opening and secured at opposite ends to said ring, substantially as set forth.

11. The combination of a trolley wheel having trunnions on its opposite sides, bushings in which said trunnions are journaled, a trolley harp having bearing sockets each of which is open at both ends and adapted to receive one of said bushings endwise and has a longitudinal slit through which the respective trunnion may be moved laterally and clamping devices for connecting the parts of each bearing socket on opposite sides of its slit, substantially as set forth.

12. The combination of a trolley wheel having trunnions on its opposite sides, bushings in which said trunnions are journaled, a trolley harp having bearing sockets each of which is open at both ends and adapted to receive one of said bushings endwise and has a longitudinal slit through which the respective trunnion may be moved laterally and clamping devices for connecting the parts of each bearing socket on opposite sides of its slit each consisting of bifurcated lugs arranged on the bearing socket above and below its slit, a rotary screw nut journaled on the members of one of said lugs, and a bolt arranged between the members of both of said lugs and engaging its threaded end with said nut while its head engages with the other lug, substantially as set forth.

13. The combination of a trolley wheel having trunnions on its opposite sides, a trolley harp having bearings in which said trunnions are journaled, contact pieces arranged in recesses in the ends of the trunnions and rotating with the latter, and spring brushes secured to the harp and pressing axially against said contact pieces but disconnected from the latter, substantially as set forth.

14. The combination of a trolley wheel having trunnions on its opposite sides, a trolley harp having bearings in which said trunnions are journaled, spring brushes secured to said harp and bearing axially against the ends of said trunnions, and retaining pins arranged on the harp and engaging with the outer sides of said springs, substantially as set forth.

15. The combination of a trolley wheel having trunnions on its opposite sides, bushings in which said trunnions are journaled, a trolley harp having bearing sockets each of which is open at both ends and adapted to receive one of said bushings endwise and has a longitudinal slit through which the respective trunnion may be moved laterally, spring brushes secured to said harp and bearing axially against the ends of said trunnions, ribs or flanges arranged on the harp on opposite sides of each brush, and retaining pins each engaging with the outer side of one of said brushes and passing at its ends through openings in the adjacent ribs, substantially as set forth.

Witness my hand this 9th day of May, 1907.

CHRISTOPHER H. BIERBAUM.

Witnesses:
   Theo. L. Popp,
   E. M. Graham.